US009227764B2

(12) United States Patent
Martino

(10) Patent No.: US 9,227,764 B2
(45) Date of Patent: Jan. 5, 2016

(54) PILF RESISTANT PACKAGING SYSTEM

(71) Applicant: Marc G. Martino, Westlake Village, CA (US)

(72) Inventor: Marc G. Martino, Westlake Village, CA (US)

( * ) Notice: Subject to any disclaimer, the term of this patent is extended or adjusted under 35 U.S.C. 154(b) by 0 days.

(21) Appl. No.: 14/214,817

(22) Filed: Mar. 15, 2014

(65) Prior Publication Data

US 2014/0262901 A1 Sep. 18, 2014

Related U.S. Application Data

(60) Provisional application No. 61/786,597, filed on Mar. 15, 2013.

(51) Int. Cl.

| | |
|---|---|
| ***G08B 13/14*** | (2006.01) |
| ***B65D 25/00*** | (2006.01) |
| ***B65D 73/00*** | (2006.01) |
| ***E04B 2/74*** | (2006.01) |
| ***E04F 13/08*** | (2006.01) |
| ***G08B 13/20*** | (2006.01) |
| *G08B 1/08* | (2006.01) |
| *G08B 13/00* | (2006.01) |
| *G08B 23/00* | (2006.01) |
| *B65D 85/00* | (2006.01) |

(Continued)

(52) U.S. Cl.

CPC ............ *B65D 25/00* (2013.01); *B65D 73/0014* (2013.01); *E04B 2/7457* (2013.01); *E04F 13/083* (2013.01); *G08B 13/20* (2013.01); *B65D 2203/10* (2013.01); *B65D 2211/00* (2013.01); *E04B 2002/7466* (2013.01); *E04B 2002/7483* (2013.01); *E04B 2002/7487* (2013.01); *H01H 35/346* (2013.01)

(58) Field of Classification Search

CPC ........ G08B 25/10; G08B 21/18; G08B 13/14; G08B 13/1427; G08B 13/00; G08B 13/08

USPC ............. 340/568.1, 539.1, 572.1, 541, 572.8; 206/459.1; 426/129

See application file for complete search history.

(56) References Cited

U.S. PATENT DOCUMENTS

| | | | | |
|---|---|---|---|---|
| 6,262,664 | B1 * | 7/2001 | Maloney | 340/572.8 |
| 7,659,816 | B2 * | 2/2010 | Wandel | 340/541 |
| 7,671,741 | B2 * | 3/2010 | Lax et al. | 340/572.1 |

(Continued)

OTHER PUBLICATIONS

MKS, "How an MKS Baratron® Capacitance Manometer Works", published on or before Oct. 23, 2007, accessed Apr. 13, 2015, <https://web.archive.org/web/20071023173934/http://www.mksinst.com/docs/UR/barainfo2b.aspx>, all pages pertinent.*

*Primary Examiner* — Jack K Wang

(57) ABSTRACT

A theft-proof packaging system includes a product package having a compartment configured to encapsulate a product, wherein the compartment is pneumatically pressurized above a surrounding environment. A pressure sensor assembly is located within the compartment. The pressure sensor assembly includes a pressure sensor, a power source electrically connected to the pressure sensor and a transmitter electrically connected to the power source. The transmitter is configured to send a signal. A receiving unit is located outside the compartment of the product package and disposed remote from the product package. The receiving unit includes a receiver configured to receive the signal from the transmitter and an alarm electrically coupled to the receiver. The pressure sensor assembly is configured to detect a change in pressure inside the compartment and then send the signal to the receiving unit activating the alarm.

10 Claims, 9 Drawing Sheets

(51) Int. Cl.
*B65B 25/06* (2006.01)
*H01H 35/34* (2006.01)

(56) References Cited

U.S. PATENT DOCUMENTS

2005/0073406 A1* 4/2005 Easley et al. ............... 340/539.1
2005/0244552 A1* 11/2005 Roth ............................. 426/129
2008/0136619 A1* 6/2008 Moran ..................... H04Q 9/00 340/505
2010/0060456 A1* 3/2010 Forster ............... G06K 19/0702 340/572.7
2013/0033364 A1* 2/2013 Raz et al. ........... G06K 19/0716 340/10.1
2013/0036802 A1* 2/2013 Johnson et al. ...... G01N 27/223 73/74

* cited by examiner

PILF RESISTANT PACKAGING SYSTEM

CROSS-REFERENCE TO RELATED APPLICATIONS

This application claims priority to provisional application 61/786,597 filed on Mar. 15, 2013, the contents of which are fully incorporated herein with this statement.

DESCRIPTION

1. Field of the Invention

The present invention generally relates to a pilf/theft resistant packaging system.

2. Background of the Invention

The present invention discloses two inventions, the first being directed to a pilf/theft resistant packaging system and the second being directed to a modular wall panel system.

The first invention concerns pilf resistant packaging and systems thereof. Theft of various products from within a store is a huge problem. A thief will literally cut a product out of the clear plastic packaging and steal the product after discarding the packaging. For instance, some department stores claim they have four knives stolen for every one knife that they actually sell. In the prior art, many have attempted to reduce the theft of such goods. The prior art has focuses at making cutting through the clear packaging more difficult such that it is a deterrent to a potential thief. However, adding a deterrent also makes the packaging harder to open for a legitimate customer. Also, various deterrents can appear ugly and deter a customer from purchasing the product. Accordingly, the present invention overcomes these problems and provides other benefits and advantages.

The second invention concerns construction of inside walls and surfaces of a building or domicile. In the prior art, construction of one's residence/home is dominated through the use of drywall. Drywall is placed over top of the studs of walls and usually insulation is placed between the spaces in the studs. Drywall is then either painted or wallpapered to finish the inside of a home.

A problem exists when a resident wants to install shelving or other various features into a dry walled wall. The home owner must purchase and use a stud finder to locate where the studs are now located. Once the studs are located, the studs are marked and then shelving can be directly attached to the studs. Shelves can be installed into the drywall itself, with special drywall screws. However, drywall is not nearly as strong as screwing directly into the studs of the home.

Many times during shelving installation the drywall is damaged or destroyed. This may occur from missing the studs when attempting to screw therein, marring the drywall with improper screws, having screws become jammed or having the threads on the screw head strip. Damage is also likely when electrical features are installed. For instance, to install a flat screen television onto a wall usually means the studs in a wall must be cross-drilled to accommodate the various electrical cords. To perform such work, a section of drywall must be removed to facilitate the installation of such electrical cords by running them through the studs. Accordingly, the present invention overcomes these problems and provides other benefits and advantages.

SUMMARY OF THE INVENTION

A theft-proof packaging system includes a product package having a compartment configured to encapsulate a product, wherein the compartment is pneumatically pressurized above a surrounding environment. A pressure sensor assembly is located within the compartment. The pressure sensor assembly includes a a pressure sensor, a power source electrically connected to the pressure sensor and a transmitter electrically connected to the power source. The transmitter is configured to send a signal. A receiving unit is located outside the compartment of the product package and disposed remote from the product package. The receiving unit includes a receiver configured to receive the signal from the transmitter and an alarm electrically coupled to the receiver. The pressure sensor assembly is configured to detect a change in pressure inside the compartment and then send the signal to the receiving unit activating the alarm.

The alarm may comprise a light or a speaker configured to produce an audible sound. The alarm may also send an alarm signal to an operator, where the alarm signal comprises a text message, an email, a phone message, a paging message.

An air pressure valve may be disposed within a surface of the compartment. The pressure sensor may comprise a pressure sensing bias, where the bias is configured to be overcome by the pneumatic pressure in the compartment and configured to not be overcome by a pressure of the surrounding environment.

A portion of the pressure sensor assembly may be in fluid communication with the inside of the compartment and an opposite portion of the pressure sensor assembly may be in fluid communication with the surrounding environment.

The pressure sensor may comprise a switch, where the switch is open in the presence of the pneumatic pressure inside the compartment and where the switch is closed when the pneumatic pressure inside the compartment is released.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
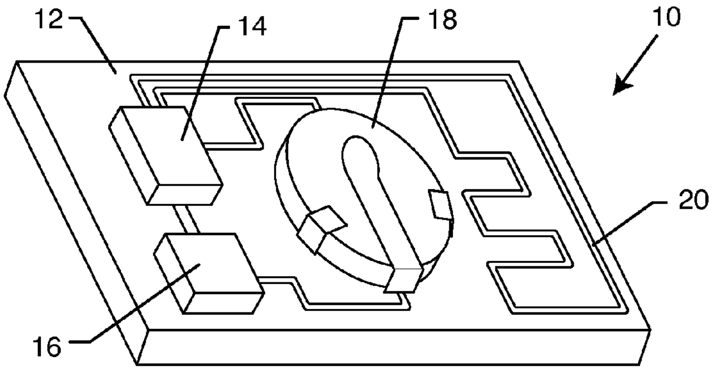
FIG. 1 is a perspective view of an exemplary pressure sensor assembly of the present invention.

FIG. 1 is a perspective view of an exemplary embodiment of the present invention. FIG. 1 shows a pressure sensor assembly 10. The pressure sensor assembly 10 is preferably small in size such that it can be placed within a packaging of a product. Many types of pressure sensor assemblies 10 may be used by one skilled in the art. A pressure sensor assembly 10 usually has a base substrate or circuit board 12. On the base substrate/circuit board 12 is mounted a power source 18, which can be a battery 18 or an externally powered passive RFID tag/receiver 18. As shown herein it is a battery 18. A battery 18 is preferred as it can transmit an extended distance as compared to a passive RFID tag and it also doesn't require a constant external signal to derive its power.

The battery 18 is connected to a microprocessor 16. The microprocessor 16 is able to perform various tasks that it is programmed to do. However, a microprocessor 16 is not even necessary in the present invention. A simple electrical circuit can be constructed that does not require the use of any electronic logic or programming, as will be later disclosed.

The battery 18 is also connected to a pressure sensor 14. Many types of pressure sensors 14 may be utilized for the present invention.

Also disposed or connected to the circuit board 12 is a transmitter/antenna 20. The transmitter 20 is configured to send a signal 44. The signal 44 may be many types of signals, such as a radio frequency signal or an infrared signal. The pressure sensor assembly 10 is constructed and configured to send the signal 44 upon detecting a pressure differential.

Figure 2:
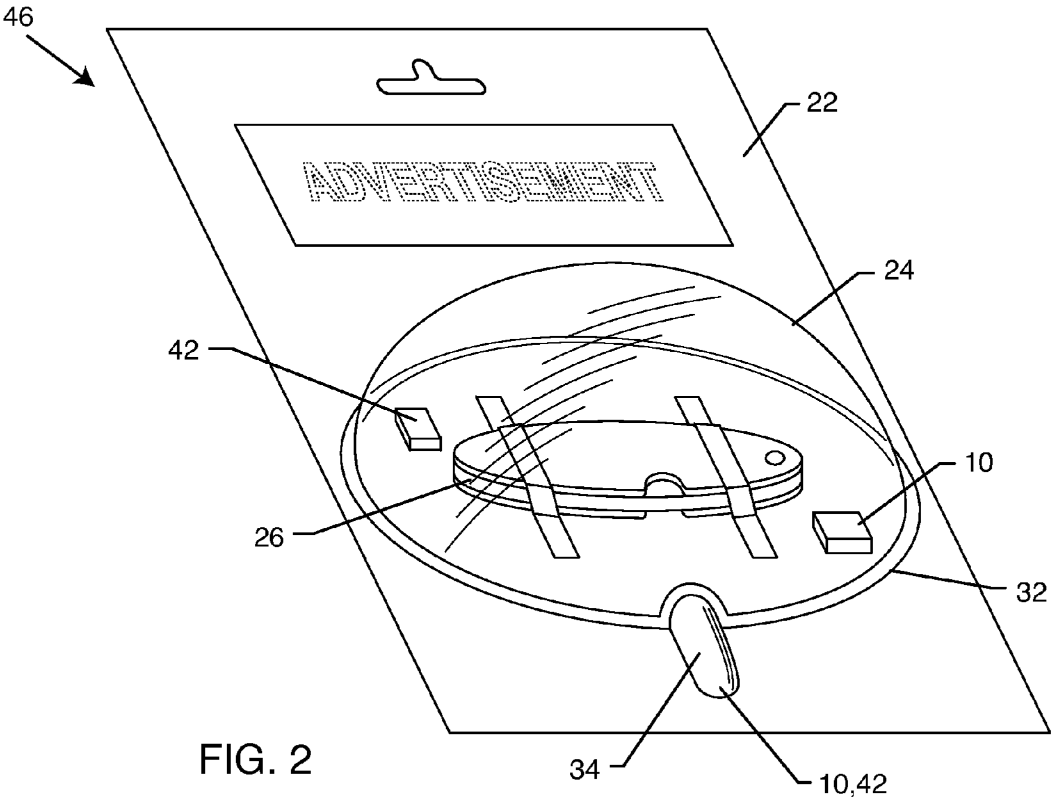
FIG. 2 is a perspective view of an exemplary product package containing the pressure sensor assembly of FIG. 1.

FIG. 2 is a perspective view of a package 46 containing a product 26. The product 26 shown herein is a knife. However, any type of product 26 can be housed within the packaging 46. The package 46 has a packaging base 22 and a packaging top 24. The packaging top 24 is shown herein as a clear bubble 24. In this way a consumer can visually see the product 26 enclosed within. It is a key aspect of the invention that the package top 24 and package bottom 22 are sealed together by a bond or seal 32 such that the enclosed volume can be pneumatically pressurized.

The pressure sensor assembly 10 is shown inside the bubble 24. The pressure sensor assembly 10 is configured to monitor the pressure inside the package 46. If a thief attempts to open the package the pressure inside the bubble 24 is released which is then detected by the pressure sensor assembly 10. The pressure sensor assembly 10 can then send a signal 44 to alert various devices.

Also shown in FIG. 2 is an RFID tag 42 attached to the package 46. The RFID tag 42 does not have to be inside the pressurized dome 24 and can be non-removably attached anywhere to the package 46. The RFID tag 42 is typically a passive RFID tag/device that can be detected when it passes through a detector. It is very typical for stores to have two scanners placed at the entrance of the store to scan for RFID tags that pass there between. This prevents a thief from attempting the steal the whole package 46. It is due to the knowledge of the RFID tag 42 that thieves will open the package 46, remove the product 26 and then discard the packaging 46.

FIG. 2 also shows a bump 34. This bump 34 is a portion of the package that may be constructed to hide either the pressure sensor assembly 10 or the RFID tag 42 from view. In this way a thief would not even know the package 46 contained any theft deterrent devices. If the pressure sensor device 10 is located within a bump 34, it must be in fluid communication with the chamber enclosing the product 26. As can be devised by one skilled in the art, various sizes and shapes of the bump 34 may be created that are aesthetically pleasing while also being functional. The present invention is not limited to the precise form disclosed and shown herein but is merely a representation of one embodiment.

Figure 3:
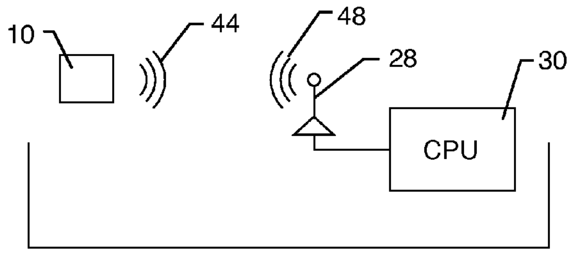
FIG. 3 is a schematic representation of the present invention in action.

FIG. 3 is a simple schematic of the present in operation. If the pressure inside the package 46 is released, the pressure sensor assembly 10 is configured to send a signal 44. The signal 44 is received by an external receiver 28. The receiver is then electrically connected to an alert device 30.

The alert device 30 can be a multitude of devices such as visual lights, audible alarm sounds, computers, cell phones, smart phones, laptop computers, specialized security systems and devices or combinations thereof. The alert device 30 can even be programmed to send a second signal 48 to alert various other devices or personnel. The second signal 48 can be a text message, an email, a pager signal, a tweet, a phone call or a phone message. The second signal 48 can be received by a buildings security system and direct security personnel to the area where the theft is occurring.

It would also be advantageous if the alert device 30 was configured to direct other electronic surveillance means to the location of the pressure sensor device 10. For instance, when a pressure sensor device 10 sends a signal 44, the location of the signal 44 can be tracked. Video of the area or location of the pressure sensor assembly 10 can be recorded and tracked. For example, two or three receivers 28 and two or three alert devices 30 can be used to accurately locate the location of the pressure sensor assembly 10.

A significant advantage of the present invention is that the exact moment a thief attempts to open a package 46 the pressure sensor assembly 10 will detect the pilfering. Yet, a customer can purchase the product and then open the package 46 outside the store. The package 46 does not have to include extra thick plastic or other theft deterrent means that is also difficult for the customer to open.

Figure 4:
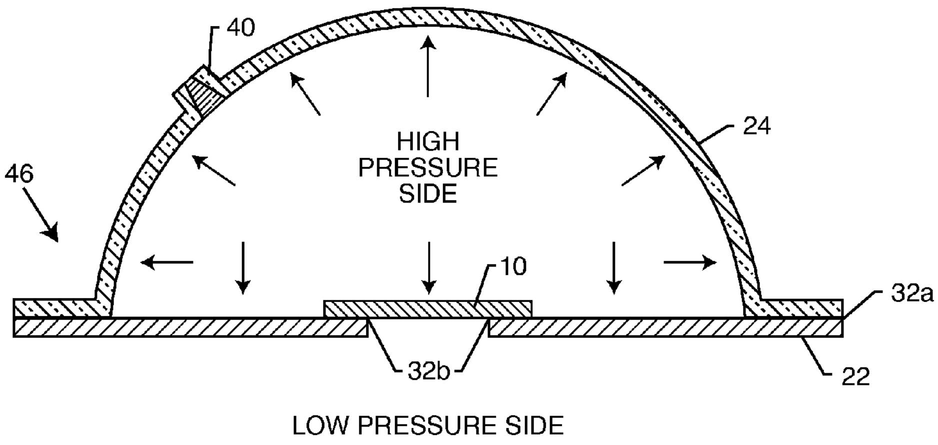
FIG. 4 is a sectional view of a pressure sensor assembly integrated with a product packaging.

FIG. 4 is a sectional view of one embodiment of the present invention. The inside of the dome 24 contains a high pressure side. A low pressure side is outside the package 46. The low pressure side is atmospheric pressure. Here, the pressure sensor assembly 10 is coupled to a wall of the package base 22. The pressure sensor assembly 10 is sealed **32*b* to the base 22. This means that the pressure sensor assembly itself has a low pressure side and a high pressure side which is used to detect a pressure change. The seal 32*a* seals the top 24 to the base 22**.

A valve 40 is also shown. The valve 40 is just one embodiment of how a high pressure is created inside the package 46. The valve 40 can be used to pressurize the inside of the package 46. Alternatively, the inside of the package 46 can be pressurized during manufacture of the package 46 when the product 26 is enclosed therein.

Figure 5:
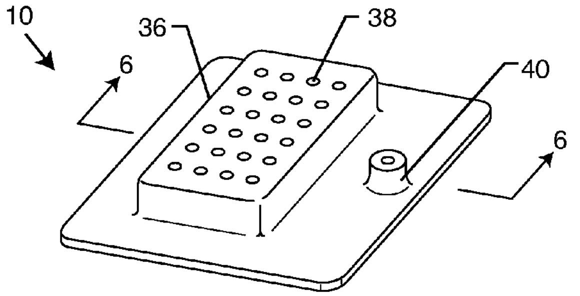
FIG. 5 is a perspective view of an exemplary pressure sensor assembly of the present invention.
Figure 6:
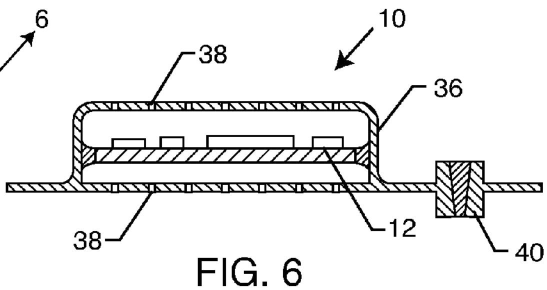
FIG. 6 is a sectional view taken of the structure of FIG. 5 along lines 6-6.

FIGS. 5 and 6 are just one example of an exemplary pressure sensor assembly 10. Shown herein, the pressure sensor assembly 10 has a housing 36. The housing 36 may then be sealed to the base 22 or top 24. The housing 36 has at least one hole/aperture 38 on each side. Air pressure is able to then flow to each side of the circuit board 12. The housing prevents a thief from tampering with the pressure sensor assembly 10 itself. The valve 40 may be integrated into the housing 36.

Figure 7:
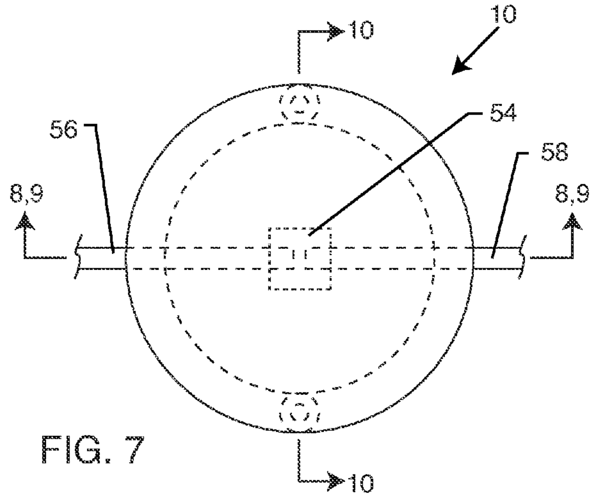
FIG. 7 is a top view of an exemplary pressure activated switch of the present invention.
Figure 8:
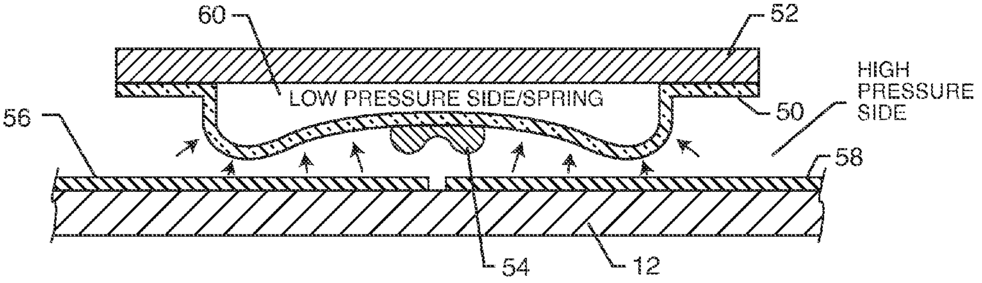
FIG. 8 is a sectional view taken of the structure of FIG. 7 along lines 8-8 wherein a high pressure is present.
Figure 9:
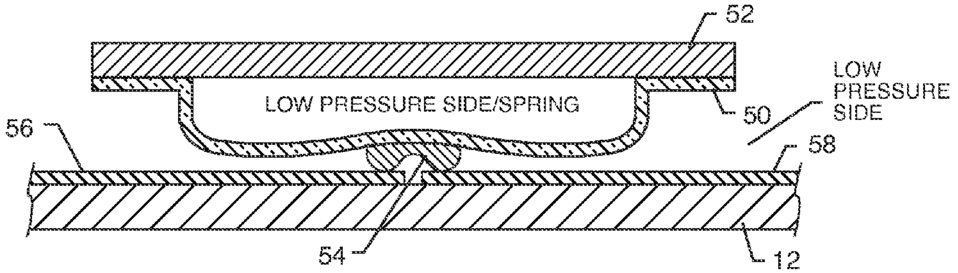
FIG. 9 is a sectional view taken of the structure of FIG. 7 along lines 9-9 wherein the high pressure is released.
Figure 10:
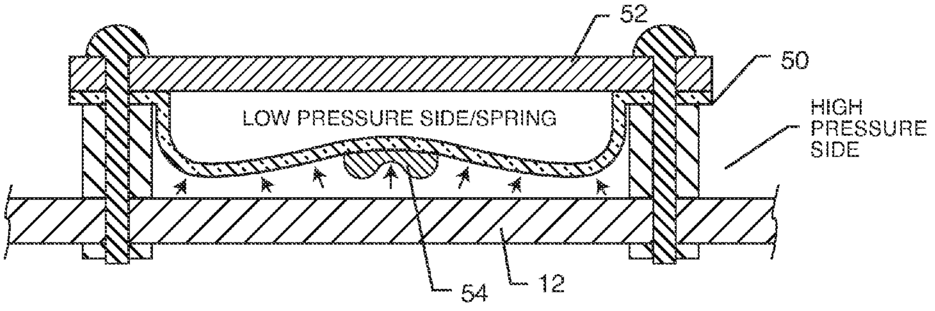
FIG. 10 is a sectional view taken of the structure of FIG. 7 along lines 10-10 wherein the high pressure is present.

It is preferred that the pressure sensor assembly 10 be fully enclosed in the pressurized enclosure of the package 46. FIGS. 7-10 show just one simple embodiment that creates a pressure sensor assembly 10. FIG. 7 is a top view of a simplistic pressure sensor assembly 10. FIGS. 8-10 are sectional views through the structure of FIG. 7. In FIGS. 8 and 10, the pressure sensor assembly 10 is disposed within a high pressure side of a package 46. High air pressure is acted upon a flexible membrane 50 that is sealed against a top substrate 52. A conductive switch 54 is placed onto the flexible membrane 50. When the pressure sensor assembly 10 is inside the high pressure side, a force is exerted against the flexible membrane 50. This then moves the conductive switch 54 away from a first conductive path 56 and a second conductive path 58. The low pressure side 60 of the membrane 50 may also be a spring/bias element (not shown) located therein. The spring/bias element is configured with the appropriate force to be actuated by a release of the pressure.

When the package 46 is opened, the membrane 50 moves downward as shown herein in FIG. 9. The conductive switch 54 then contacts the first and second conductive paths 56 and 58 which then completes an electrical circuit to send the signal 44. The exemplary embodiments disclosed herein is merely representative of just one example of a pressure sensor assembly 10. It is understood that those skilled in the art after understanding this disclosure could use other structures and geometries to accomplish similar goals and objectives. Therefore, the invention is not limited to the precise forms disclosed herein. The provisional application 61/786,597 also showed a similar embodiment of a pilf resistant packaging system embodying the present invention. The contents of the provisional application are incorporated herein with this reference.

Figure 11:
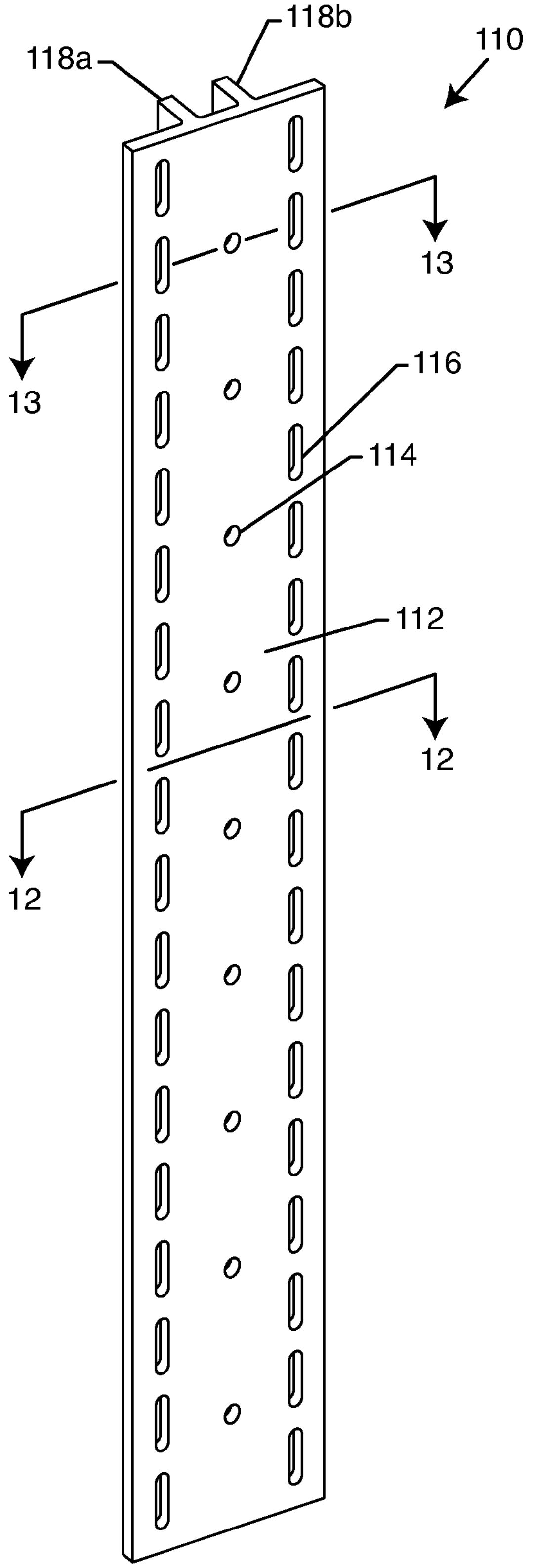
FIG. 11 is a perspective view of an exemplary plate embodying the present invention.
Figure 12:
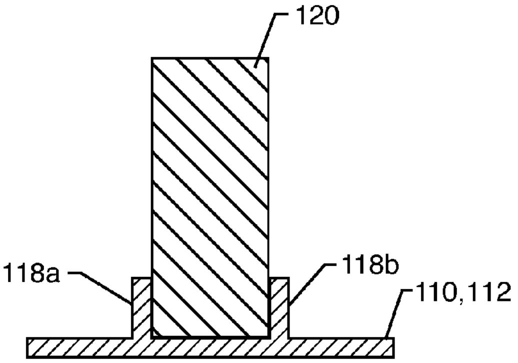
FIG. 12 is a sectional view taken of the structure of FIG. 11 along lines 12-12.
Figure 13:
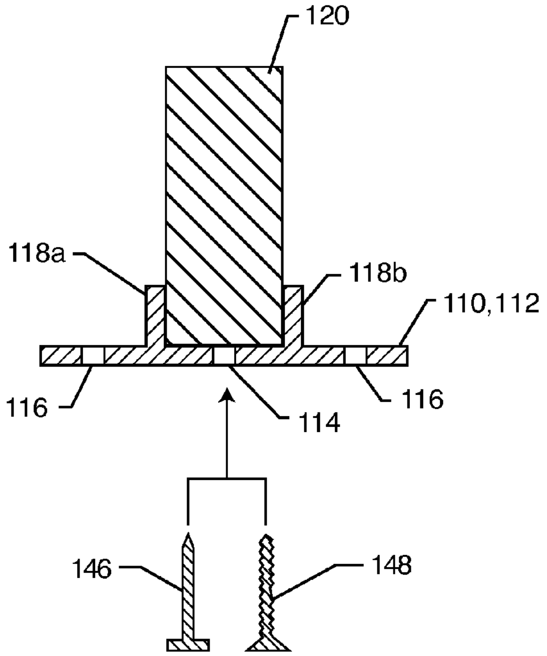
FIG. 13 is a sectional view taken of the structure of FIG. 11 along lines 13-13.
Figure 14:
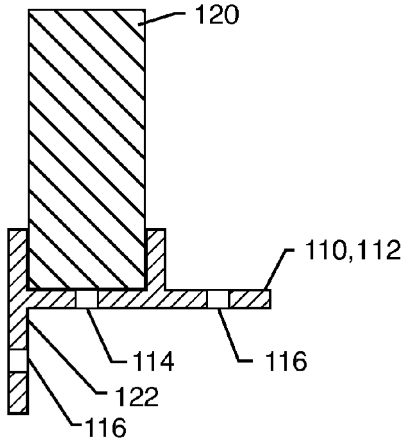
FIG. 14 is a sectional view similar to FIG. 13 now where the plate has an angled bend.
Figure 15:
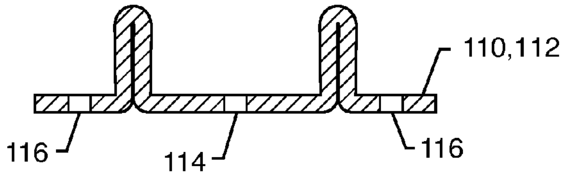
FIG. 15 is a sectional view similar to FIG. 13 now where the plate is manufactured in a bending step.

The second invention disclosed herein discloses a modular wall panel system 100. FIG. 11 is a perspective view of an exemplary track 110. The track 110 is a relatively long and thin structure that is configured to be mounted directly to a stud 120. Therefore, the track 110 would typically be quite long such that it was able to be mounted to a significant portion of the stud 120. The track 110 may be made from a variety of materials and methods. It would be typical for the track 110 to be made from an extrusion of metal as shown in FIGS. 12, 13 and 14. However, the track 110 can be made from a flat piece of metal and then folded into shape as shown in FIG. 15. The track 110 may be made from any structural material including metal, plastic, polymers, composites or combinations thereof.

The track 110 has a flat base 112 which includes a plurality of fixture holes 114 and a plurality of slots 116. The track 110 also has first extension 118*a* and a second extension 118*b*. The extensions 118 are typically perpendicular to the base 112. The width between the extensions are the same as the width of a 2×4 used in building constructions. The extensions 118 are used as guides to help place and capture the stud 120. During attachment of the track 110 to the stud 120, the extensions 118 dramatically increase the ease of placement. Fasteners may then be used to permanently attach the track 110 to the stud 120. As shown in FIG. 13, either a nail 146 or a screw 148 can be used to go through the hold 114 and permanently attach the track 110 to the stud 120.

Figure 16:
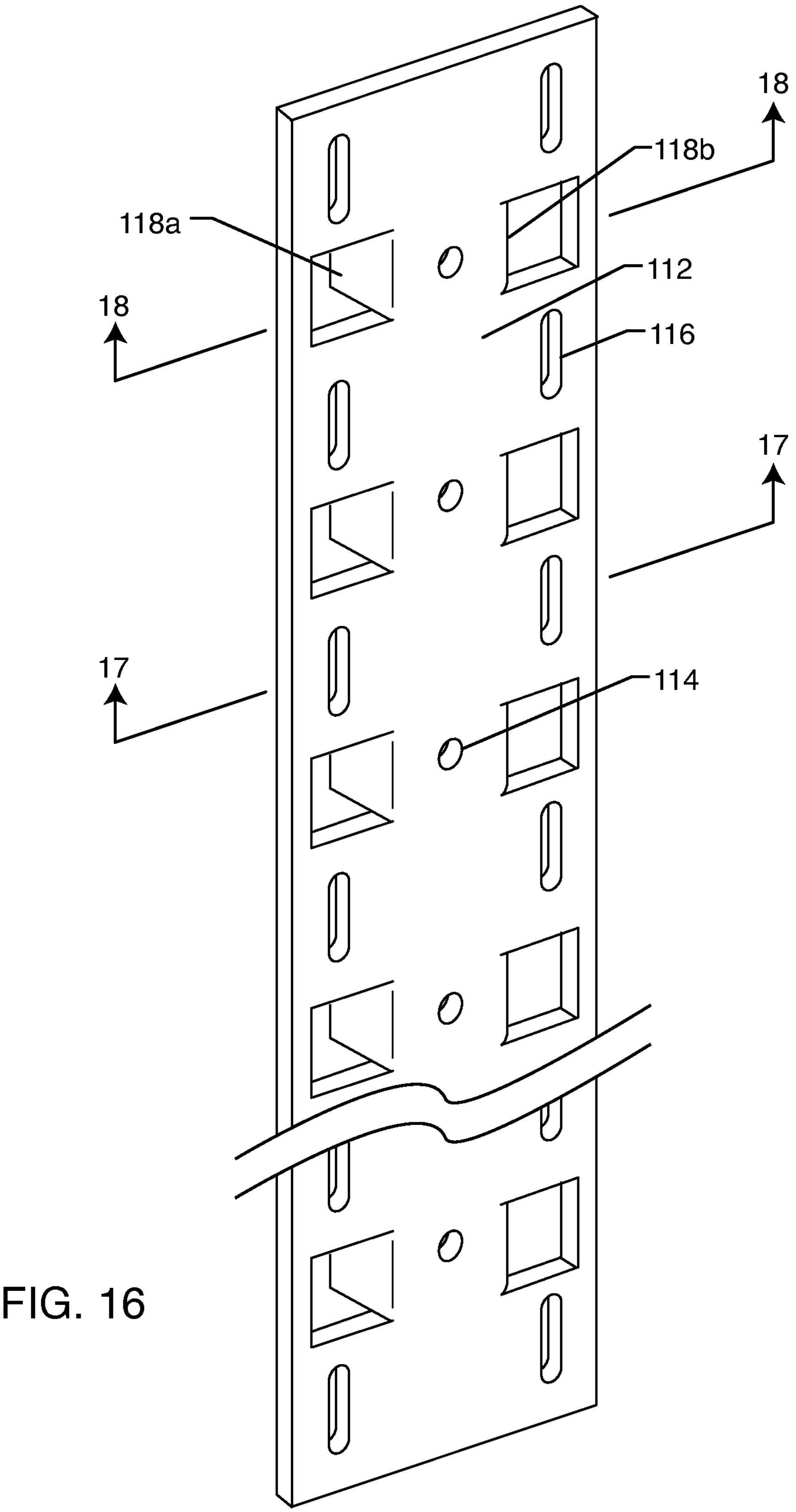
FIG. 16 is a perspective view of another exemplary plate embodying the present invention.
Figure 17:
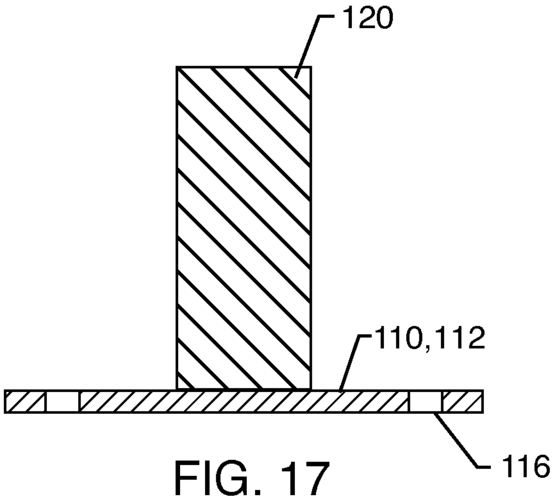
FIG. 17 is a sectional view taken of the structure of FIG. 16 along lines 17-17.
Figure 18:
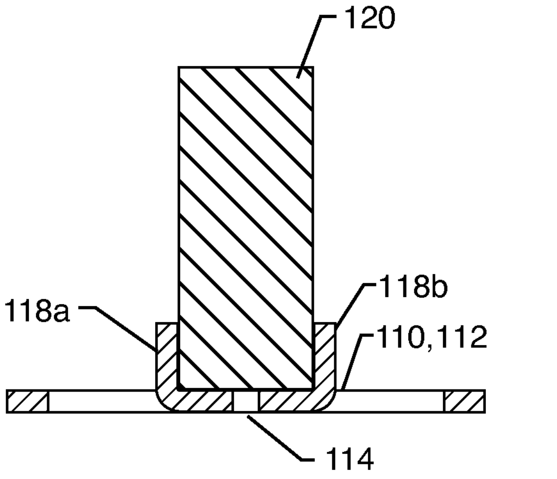
FIG. 18 is a sectional view taken of the structure of FIG. 16 along lines 18-18.

FIGS. 16-18 show an embodiment where the track 110 is comprised of a flat base 112. Then the holes 114 and slots 116 are punched through the base 112 in one operation. At the same time the extensions 118 can be formed as tabs 118*a* and 118*b* that are bent over. In this manner the tabs 118, holes 114 and slots 116 can be made in one stamping operation.

FIG. 14 is an embodiment of the track 110 that has an angle 122 to the base 112. This embodiment would be best used in a corner of a building's wall.

Figure 19:
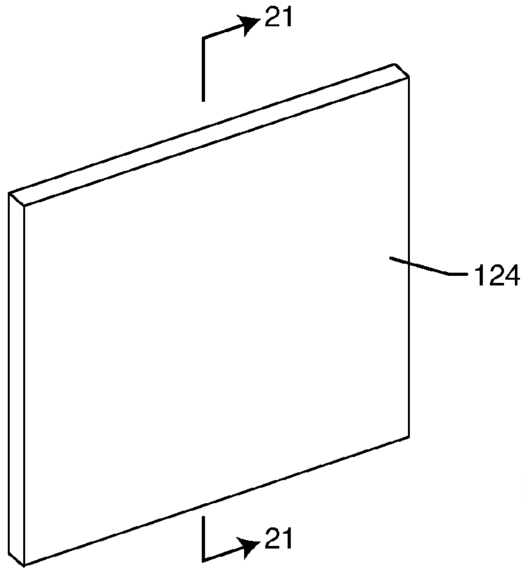
FIG. 19 is a perspective view of a front side of an exemplary panel of embodying the present invention.
Figure 20:
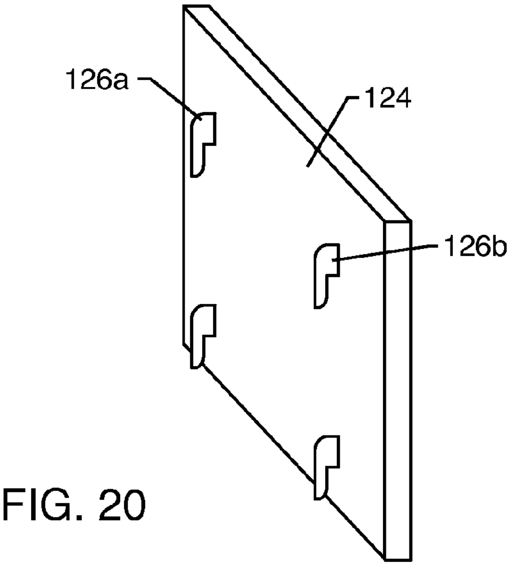
FIG. 20 is a perspective view of the back side of the structure of FIG. 19.
Figure 21:
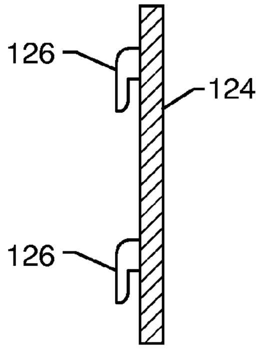
FIG. 21 is a sectional view of the structure of FIG. 19 taken along lines 21-21.

FIGS. 19-21 show one embodiment of an exemplary embodiment of a panel 124 of the present invention. The panel 124 may be made of a single substrate 124 or a plurality of substrates. Various materials can comprise the panel 124 such as wood, plastics, polymers, metal, composites or combinations thereof. On a backside of the panel 124 are a plurality of hooks 126. Each panel 124 has at least a left-side hook 126*a* and a right side hook 126*b*. The hooks 126 are configured to slip within the slots 116 and engage the slots 116 such that the panel is fixed and captured to the track 110. The dimension between the left-side hook 126*a* and the right-side hook 126*b* is spaced to be equal to the slots 126 on two adjacent tracks 110 when installed upon the studs 120. If studs 120 are placed 16 inches apart, it is foreseeable that the distance between the hooks 126 would be about 12-15 inches, or around 14 inches.

It is important that the studs 120 be accurately placed during manufacturing. Therefore, a surrogate panel (not shown) can be made that is simply two hooks separated at a set distance. The surrogate panel is used to locate the studs before they are affixed to the permanent structure. The surrogate panel can then be removed or left in place for structural strength and continued alignment. The surrogate panel may be one thin piece of material that is designed to fit behind the regular panels 124.

The present invention teaches one embodiment of slots 116 and hooks 126 used for removably attaching the panels 124 to the tracks 110. However a variety of structures could be used that accomplish similar functionality. Therefore, this disclosure is not limited to the precise forms described and shown herein.

Figure 22:
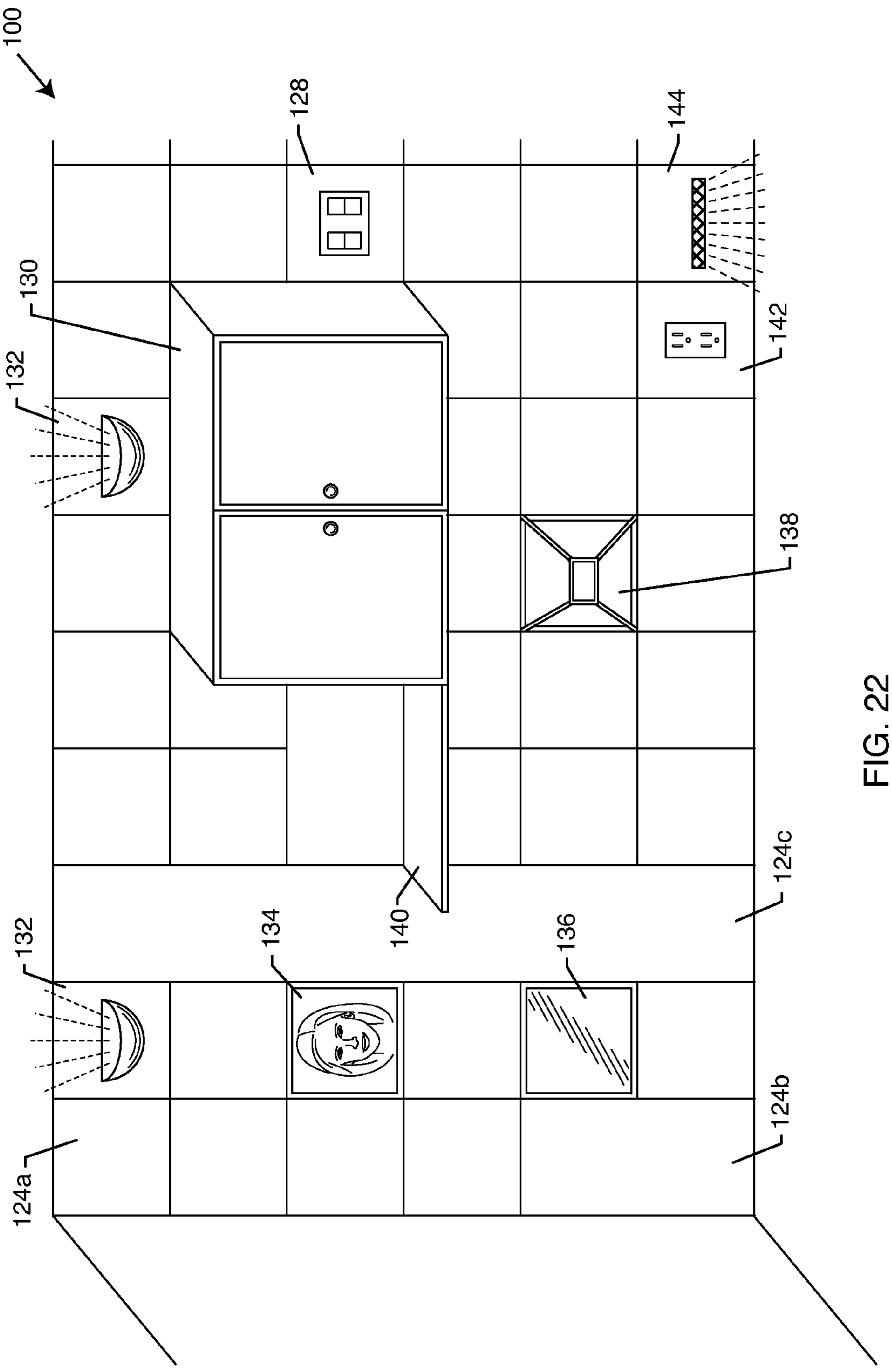
FIG. 22 is a perspective view of an exemplary embodiment of the modular wall paneling system of the present invention.

FIG. 22 shows a perspective view of the modular wall panel system 100. The panels 124 can come in a variety of sizes and shapes. Panel 124*a* is square in shape. Panel 124*b* is rectangular in shape. Panel 124*c* is very long and rectangular in shape and extends from the floor to the ceiling.

The panels 124 can also be configured with a variety of structures and features such as light switch panel 128, cabinet panel 130, light bulbs panel 132 (backlight panel also possible), picture frame panel 134, mirror panel 136, T.V. stand panel 138 (any electronic equipment stand also possible), shelf panel 140, electrical socket panel 142, air register panel 144, and any other unique and custom panel 124. Panels 124 can also include rods (not shown) for hanging clothing, such as is used in a closet. As one can see the use of specially configured panels 124 is endless.

As can be seen by one skilled in the art, the panels and various panel features are easily moved and replaced. This provides the user with an ability to easily change and customize a wall for their particular needs. The present invention is ideally suited to be used along walls such as inside closets and along entertainment walls that would utilize and store a variety of electrical equipment or inside garages where storage, configurability and modularity is desired.

The panels themselves can come in a variety of shapes, but also in a variety of materials, textures and design. For instance, panels can come in different colors where a user doesn't need to repaint a wall but needs to simply exchange one set of panels for another. The panels can be metalized, cloth covered or wall paper covered to create various designs. The panels may be covered in only a thin fabric and sound insulation placed between the studs to help absorb sound for use in a sound room.

Various panel exchanges can be set up where a customer can exchange one panel for another. For instance, a customer can remove a set of panels and get credit for returning unneeded panels. This credit can then be used to help pay for new panels of varying designs. An aftermarket economy is possible that deals with trading used panels between customers.

The present invention replaces the need for drywall. Therefore some cost saving is associated with the reduction of materials and labor for installing and surfacing the drywall. Also, it is easy for a user to reconfigure a specific wall layout without the need for tools or specialized expertise in home construction. Any person can simply take a panel off and replace it with a new panel, as it literally only takes seconds to accomplish.

The panels are also earthquake proof, as the hook 126 is securely held within the slots 116.

The provisional application 61/786,597 also showed a similar embodiment of a modular wall panel system bodying the present invention. The contents of the provisional application are incorporated herein with this reference Although several embodiments have been described in detail for purposes of illustration, various modifications may be made to each without departing from the scope and spirit of the invention. Accordingly, the invention is not to be limited, except as by the appended claims.

What is claimed is:

1. A theft-proof packaging system, comprising:
- a product package including a compartment configured to encapsulate a product, wherein the compartment is pneumatically pressurized above a surrounding environment, and wherein the compartment is a clear plastic compartment showing the product encapsulated therein;
- a pressure sensor assembly located within the compartment, the pressure sensor assembly comprising:
  - a pressure sensor;
  - a power source electrically connected to the pressure sensor wherein the power source is a battery; and
  - a transmitter electrically connected to the power source, wherein the
  transmitter is configured to send a signal;
- a receiving unit located outside the compartment of the product package and disposed remote from the product package, the receiving unit comprising:
  - a receiver configured to receive the signal from the transmitter;
  - an alarm electrically coupled to the receiver;
- wherein the pressure sensor assembly is configured to detect a change in pressure inside the compartment and then send the signal to the receiving unit activating the alarm; and
- a passive RFID tag located within the compartment, the passive RFID tag configured to be detected when it passes through a walk-through scanner and activating a second alarm associated with the walk-through scanner.

2. The system of claim 1, wherein the alarm comprises a light.

3. The system of claim 1, wherein the alarm comprises a speaker configured to produce an audible sound.

4. The system of claim 1, wherein the alarm sends an alarm signal to an operator, the alarm signal comprising a text message, an email, a phone message, or a paging message.

5. The system of claim 1, including an air pressure valve disposed within a surface of the compartment.

6. The system of claim 1, wherein the pressure sensor comprises a pressure sensing bias, the bias configured to be overcome by the pneumatic pressure in the compartment and configured to not be overcome by a pressure of the surrounding environment.

7. The system of claim 1, wherein a portion of the pressure sensor assembly is in fluid communication with the inside of the compartment and an opposite portion of the pressure sensor assembly is in fluid communication with the surrounding environment.

8. The system of claim 1, wherein the pressure sensor comprises a switch, where the switch is open in the presence of the pneumatic pressure inside the compartment and the switch is closed when the pneumatic pressure inside the compartment is released.

9. A theft-proof packaging system, comprising:
- a product package including a clear plastic compartment configured to encapsulate and show a product therein, wherein the compartment is pneumatically pressurized above a surrounding environment;
- a pressure sensor assembly in pneumatic communication with the compartment, the pressure sensor assembly comprising:
  - a pressure sensor, wherein the pressure sensor comprises a switch, where the switch is in one state in the presence of the pneumatic pressure inside the compartment and the switch is in a second state when the pneumatic pressure inside the compartment is released;
  - a battery electrically connected to the pressure sensor; and
  - a transmitter electrically connected to the power source, wherein the transmitter is configured to send a signal;
- a receiving unit located outside the compartment of the product package and disposed remote from the product package, the receiving unit comprising:
  - a receiver configured to receive the signal from the transmitter;
  - an alarm electrically coupled to the receiver;
- a passive RFID tag in pneumatic communication with the compartment;
- wherein the pressure sensor assembly is configured to detect a change in pressure inside the compartment and then send the signal to the receiving unit activating the alarm; and
- wherein the passive RFID tag is configured to be detected when it passes through a walk-through scanner thereby activating a second alarm, the second alarm associated with the walk-through scanner.

10. A theft-proof packaging system, comprising:
- a product package including a clear plastic compartment configured to show and encapsulate a product therein, wherein the compartment is pneumatically pressurized above a surrounding environment;
- a pressure sensor assembly in pneumatic communication with the compartment, the pressure sensor assembly comprising:
  - a pressure sensor, wherein the pressure sensor comprises a switch, where the switch is open in the presence of the pneumatic pressure inside the compartment and the switch is closed when the pneumatic pressure inside the compartment is released;

a battery electrically connected to the pressure sensor; and a transmitter electrically connected to the power source, wherein the transmitter is configured to send a signal;

a receiving unit located outside the compartment of the product package and disposed remote from the product package, the receiving unit comprising:

a receiver configured to receive the signal from the transmitter;

an alarm electrically coupled to the receiver;

a passive RFID tag in pneumatic communication with the compartment;

wherein the pressure sensor assembly is configured to detect a change in pressure inside the compartment and then send the signal to the receiving unit activating the alarm; and wherein the passive RFID tag is configured to be detected when it passes through a walk-through scanner thereby activating a second alarm associated with the walk-through scanner.

* * * * *